UNITED STATES PATENT OFFICE.

SALVADOR AGUILAR, OF NEW YORK, N. Y.

PREPARATION FOR PRESERVING LEATHER.

1,121,220.     Specification of Letters Patent.     Patented Dec. 15, 1914.

No Drawing.     Application filed September 30, 1913. Serial No. 792,569.

*To all whom it may concern:*

Be it known that I, SALVADOR AGUILAR, a citizen of the Republic of Guatemala, and a resident of the borough of Manhattan, city and State of New York, have invented certain new and useful Improvements in Preparations for Preserving Leather, of which the following is a specification.

This invention relates to preparations for preserving leather, and has for its object to provide a new composition of matter which is intended to be used on shoes, slippers, and the like, for the purpose of making the leather soles thereof more tenacious and more capable of resisting wear and tear due to the use thereof.

Another object of my invention is to provide such a composition of matter which may be readily applied to the leather, and the advantage of which would be to bring about a great economy for everyone using shoes, and especially in the case of families where the wearing out of shoes is a considerable item.

To accomplish the object of the invention as set forth, I have investigated a large number of substances and applied them to the soles of shoes and slippers, and tested the use of such applications, for the purpose of determining their action, and the wearing qualities of the leather after the preparation has been applied. After considerable testing and experimenting, and after a large amount of thought and consideration, I have tested and found satisfactory the following composition of matter, which consists of twenty-five parts of caoutchouc, sixty parts of gum or glue water, ten parts of enamel, white or black, or any color depending upon the adaptation of the preparation, and five parts of turpentine, all intimately mixed together, and permitted to stand after mixing, so as to bring about an intimate mixture of the various parts. I have found that deviations from the proportions given do not result in the same efficiency, and break up the underlying principle of the invention, and make the corresponding mixture of little value, but on the other hand, I have found that with the constituents suggested, and in the proportions given, and on following my directions, I have brought about a new composition of matter which has useful purposes. After these parts have been measured out and intimately mixed in the proportions given, they are applied to the sole of a shoe with a brush, and the leather, with the preparation applied thereto, is allowed to dry. I have found that on drying the leather becomes tenacious to resisting wear and tear, and shoes so prepared have a much longer life than shoes that are used in the ordinary manner. When I say that I use enamel I mean that I use zapolin and this either black or white to the amount of ten grams, the glue that is used is animal glue, ten per cent. parts of glue in water. The rubber that is used is native rubber and the turpentine is spirits of turpentine.

By the use of my improved composition of matter, in accordance with the invention described, a great economy in the use of shoes has been perfected, and in view of the fact that such preparations can be readily put up and sold at a very small cost, the composition may be prepared and sold so as to be of general value and utility to those using it.

Having thus described my invention, I claim as new and desire to secure by Letters Patent:

An improved composition of matter, comprising twenty-five parts of caoutchouc, sixty parts of glue water, ten parts of enamel, and five parts of turpentine, all intimately mixed together.

In testimony that I claim the foregoing as my invention, I have signed my name in presence of two subscribing witnesses.

SALVADOR AGUILAR.

Witnesses:
   Mrs. M. L. ROUQUIER,
   F. FISK.